(12) United States Patent
van Dorp (10) Patent No.: US 8,704,702 B2
(45) Date of Patent: Apr. 22, 2014

(54) METHOD FOR ESTIMATING AN OBJECT MOTION CHARACTERISTIC FROM A RADAR SIGNAL, A COMPUTER SYSTEM AND A COMPUTER PROGRAM PRODUCT

(75) Inventor: Philip van Dorp, Delfgauw (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/144,153

(22) PCT Filed: Jan. 15, 2010

(86) PCT No.: PCT/NL2010/050020
§ 371 (c)(1),
(2), (4) Date: Sep. 16, 2011

(87) PCT Pub. No.: WO2010/082824
PCT Pub. Date: Jul. 22, 2010

(65) Prior Publication Data
US 2012/0001787 A1    Jan. 5, 2012

(30) Foreign Application Priority Data

Jan. 15, 2009  (EP) ..................... 09150675

(51) Int. Cl.
*G01S 13/58*  (2006.01)
*G01S 13/06*  (2006.01)
*G01S 13/00*  (2006.01)

(52) U.S. Cl.
USPC .......... 342/115; 342/27; 342/28; 342/59; 342/89; 342/90; 342/104; 342/118; 342/123; 342/126; 342/145; 342/146; 342/147; 342/175; 342/195

(58) Field of Classification Search
USPC ............... 342/21, 22, 27, 28, 59, 89, 90, 342/104–115, 118, 123, 145–147, 175, 176, 342/179, 192–197, 1, 61–64, 73–75, 91, 342/93–95, 159–163, 125–127, 450–465
See application file for complete search history.

(56) References Cited

U.S. PATENT DOCUMENTS 3,286,263 A * 11/1966 Hammack ............... 342/126
3,691,558 A *  9/1972 Hoard et al. ............. 342/28

(Continued)

FOREIGN PATENT DOCUMENTS

FR    2914432 A1 * 10/2008
WO   WO 2007/073173    6/2007

OTHER PUBLICATIONS

International Search Report, from PCT/NL2010/050020, dated Apr. 10, 2010.

(Continued)

*Primary Examiner* — Bernarr Gregory
(74) *Attorney, Agent, or Firm* — Swanson & Bratschun, L.L.C.

(57) ABSTRACT

The invention relates to a method for estimating an object motion characteristic from a radar signal. The method comprises the step of receiving radar data of an object from a multiple beam radar system. Further, the method comprises the steps of associating radar data with estimated height and/or cross-range information of object parts causing the corresponding radar data and fitting an object model with radar data being associated with a selected estimated height and/or cross-range information interval. The method also comprises the step of determining an object motion characteristic from the fitted object model.

15 Claims, 7 Drawing Sheets

(56) References Cited

U.S. PATENT DOCUMENTS

| | | | |
|---|---|---|---|
| 4,786,908 A * | 11/1988 | Runnalls | 342/63 |
| 5,325,098 A * | 6/1994 | Blair et al. | 342/95 |
| 5,337,055 A * | 8/1994 | Ghignoni | 342/93 |
| 5,471,435 A * | 11/1995 | Marschall | 342/196 |
| 5,479,360 A * | 12/1995 | Seif et al. | 342/95 |
| 5,546,084 A * | 8/1996 | Hindman | 342/161 |
| 5,592,176 A * | 1/1997 | Vickers et al. | 342/75 |
| 5,801,970 A * | 9/1998 | Rowland et al. | 342/63 |
| 5,900,835 A * | 5/1999 | Stein | 342/90 |
| 5,945,940 A * | 8/1999 | Cuomo | 342/90 |
| 6,038,526 A * | 3/2000 | Stein | 342/159 |
| 6,188,350 B1 * | 2/2001 | Neumerkel et al. | 342/104 |
| 6,269,172 B1 * | 7/2001 | Rehg et al. | 342/1 |
| 6,359,586 B1 * | 3/2002 | Sviestins | 342/59 |
| 6,614,384 B2 * | 9/2003 | Hall et al. | 342/28 |
| 6,694,044 B1 * | 2/2004 | Pavlovic et al. | 342/95 |
| 6,762,711 B1 * | 7/2004 | Doerfler | 342/118 |
| 6,788,243 B2 * | 9/2004 | Lavoie | 342/195 |
| 6,808,139 B1 * | 10/2004 | Sturm | 342/61 |
| 6,822,604 B2 * | 11/2004 | Hall et al. | 342/28 |
| 6,850,186 B2 * | 2/2005 | Hellsten | 342/118 |
| 6,999,601 B2 * | 2/2006 | Pavlovic et al. | 342/95 |
| 7,002,510 B1 * | 2/2006 | Choate et al. | 342/118 |
| 7,006,031 B1 * | 2/2006 | Abatzoglou et al. | 342/195 |
| 7,030,814 B2 * | 4/2006 | Stone et al. | 342/108 |
| 7,148,836 B2 * | 12/2006 | Romero et al. | 342/22 |
| 7,336,222 B2 * | 2/2008 | Praskovsky et al. | 342/195 |
| 7,355,545 B2 * | 4/2008 | Zemany et al. | 342/22 |
| 7,394,046 B2 * | 7/2008 | Olsson et al. | 342/175 |
| 7,460,052 B2 * | 12/2008 | Zemany et al. | 342/22 |
| 7,541,968 B2 * | 6/2009 | Hall et al. | 342/28 |
| 7,626,534 B1 * | 12/2009 | Boka et al. | 342/90 |
| 7,652,620 B2 * | 1/2010 | Lee et al. | 342/195 |
| 2006/0061504 A1 | 3/2006 | Leach | |
| 2006/0250294 A1 | 11/2006 | Zemany | |

OTHER PUBLICATIONS

Lin and Ling (2006) Electronics Letters 42(11), "Frontal Imaging of Human Using Three-Element Doppler and Direction-of-Arrival Radar".

van Dorp and Groen (2003) IEE Proc. Radar Sonar Navig 150(5):356, "Human Walking Estimation with Radar".

* cited by examiner

METHOD FOR ESTIMATING AN OBJECT MOTION CHARACTERISTIC FROM A RADAR SIGNAL, A COMPUTER SYSTEM AND A COMPUTER PROGRAM PRODUCT

RELATED APPLICATIONS

This application is a 35 U.S.C. §371 national phase application of PCT/NL2010/050020 (WO 2010/082824), filed on Jan. 15, 2010, entitled "A Method for Estimating an Object Motion Characteristic From a Radar Signal, a Computer System and a Computer Program Product", which application claims priority from European Application No. 09150675.8, filed Jan. 15, 2009, which is incorporated herein by reference in its entirety.

TECHNICAL FIELD

The invention relates to a method for estimating an object motion characteristic from a radar signal.

BACKGROUND

Radar signals serve as a useful sensing technique for observing objects, such as persons, animals and/or vehicles. If the object or a part of the object has rotation or translation in addition to the body motion, it might induce a frequency modulation and amplitude modulation on the radar return signal. These modulations are the so-called micro-Doppler or micro-motion effects and is observed in the 2-D time-speed space. By analyzing radar signals such objects can also be observed in situations where they are not or less visible for the human eye, e.g. behind walls or at great distances.

The challenge of motion estimation with radar, e.g. human motion estimation, has existed since the beginning of radar and has continued in modern radar applications. However, the technology has been hindered by performance and cost barriers typically associated with the development of modern radar applications. In public applications radar becomes more and more interesting and available at low cost. In many applications the radar shall provide location, speed and reflected power of stationary and moving objects. By combining a number of low cost radar sensors a non-coherent radar sensor network can be built which provides additional object information. This non-coherent radar sensor network uses radar sensors without synchronization of frequency or phase to keep the system at low cost.

Several low cost commercial off-the-shelf (COTS) radar sensors have been developed in recent years for public applications. One category is the automotive radar. These radars operate under all weather conditions, day and night. An object position may be determined by trilateration of the measured distances of individual range profiles. An extremely high range accuracy of each radar sensor inside the network is needed for sufficient trilateration angle accuracy. The classification algorithm classifies the target in six groups: cars, cyclists, pedestrians, trees, traffic signs and a group of persons. Classification is based on range, cross-range, speed and power.

Another category of low cost radar sensors is developed for application areas like traffic monitoring, automatic door openers, alarm equipment, sanitary equipment, sport applications etc. Standard products with radar frequency (RF) front-end and antenna are available with relatively low prices. Here radar systems are no longer price determinative and applications with multiple radars can be built. The radar systems in these categories satisfy government regulations and can be applied in public areas.

Low cost radar sensors have however also disadvantages. They have not been developed for a specific application and as a result there is generally no parameter match and the system is fixed. Parameters such as the antenna beam width, transmitter frequency, sweep repetition frequency, transmitter power, angle measurements etc. gives the possibility to extract specific target information. The technical performance is related with the price such as the noise level, the Frequency Modulated Continuous Wave (FMCW) radar sweep linearity and parameter settings. A number of these shortcomings can be solved in the post-processing but others are more fundamental and can not be solved that way. Angle measurements used in radar imaging can be realized in several ways, antenna beam scanning radar sensors, radar sensors that depend on the phase information for angular resolution and by combining information from multiple radar sensors. Low cost radars can be used in this last group.

Characteristics of these low cost radar sensors are the unsynchronized transmitted frequency and phase and transmitted power. In case of a FMCW radar sensor network the range-speed responses are time synchronized. Trilateration can be used by combining information from multiple noncoherent radar sensors. Non-coherent means the phase information can not be used for angular information. To locate an object in three dimensions a minimum of three measurements with different radar sensor locations are necessary. This approach works if the object behaves as a point target when there is only one object and the object is illuminated by each of the radars. The approach is very sensitive for distance errors when the baseline is small. Humans give an extended response and do not satisfy to these assumptions at all. A human contains independently moving reflection points and the illuminated part depends on the radar senor network. Besides these a human causes multi-path reflections and scintillation. Multi-path is the phenomenon where the phase interferes between the direct echo and the indirect echo reflected by the environment or another human body parts. Scintillation results from two or more direct echoes interfering with each other. Both multi-path and scintillation make it impossible or very difficult to distinguish individual human body parts.

SUMMARY OF THE EMBODIMENTS

It is an object of the invention to provide a method according to the preamble for obtaining more detailed motion characteristics. Thereto, the method according to the invention comprises the steps of receiving radar data of an object from a multiple beam radar system, associating radar data with estimated height and/or cross-range information of object parts causing the corresponding radar data, fitting an object model with radar data being associated with a selected estimated height and/or cross-range information interval, and determining an object motion characteristic from the fitted object model.

By receiving multiple beam radar system data, height and/or cross-range information can be estimated of object parts causing radar data. By fitting an object model with radar data associated with said estimated height and/or cross-range information, specific object motion characteristics can be determined from the object parts at the specific heights and/or cross-range extension or position, e.g. arms. As a result, specific details of an object motion, e.g. a human body motion, can be retrieved.

It is noted that height information relates to radar elevation information. Further, cross-range information relates to information of the object in a horizontal direction transverse with respect to the range direction, also called azimuth information. So, height and/or cross-range information relate to object position and/or spatial extension information in at least one direction substantially transverse with respect to the range direction.

It is further noted that a multiple beam radar system is a radar system that transmits a multiple number of beams so that independent height and/or cross range information can be obtained from the sensed object.

Further, the invention relates to a computer system.

Additionally, the invention relates to a computer program product. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

Other advantageous embodiments according to the invention are described in the following claims.

BRIEF DESCRIPTION OF THE DRAWINGS

By way of example only, embodiments of the present invention will now be described with reference to the accompanying figures in which.

The figures are merely schematic views of preferred embodiments according to the invention. In the figures, the same reference numbers refer to equal or corresponding parts.

DETAILED DESCRIPTION

Figure 1:
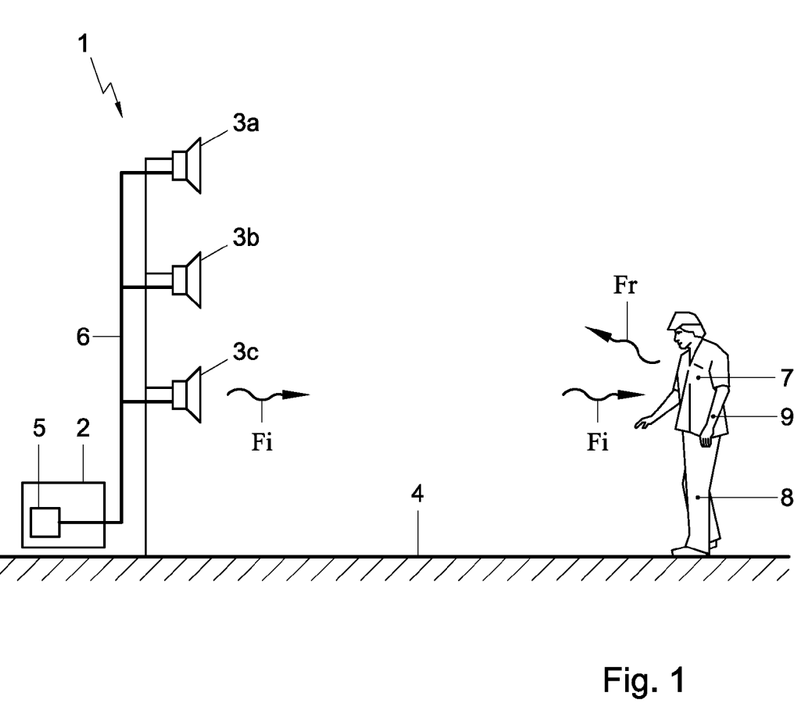
FIG. 1 shows a radar system and a computer system according to the invention.

FIG. 1 shows a multiple beam radar system 1. The radar system 1 comprises a multiple number of radar stations 3a-c positioned at different heights above a surface 4. Further, FIG. 1 shows a computer system 2 according to the invention. The computer system 2 comprises a processor 5 that is arranged for performing a number of steps. The computer system 2 is connected to the multiple number of radar stations 3a-c via data lines 6.

The radar stations 3a-c are of the FMCW type transmitting a frequency modulated continuous wave signal and have been placed in a linear array with e.g. a mutual distance of 0.55 m looking ahead. The continuous wave signal is modulated in frequency to produce a linear sweep that is radiated towards a target through the antenna. The echo received later is mixed with a portion of the transmitted signal to produce the beat frequency which is proportional with a round trip time covering the two-way distance between the radar and the target. The radar station altitudes are thus e.g. 0.6 m, 1.15 m and 1.7 m. The antenna pattern may e.g. have a horizontal beam width of circa 12 degrees and a vertical beam width of circa 28 degrees, circa 24 GHz transmitter frequency, circa 500 MHz bandwidth and 2 kHz sweep repetition frequency. The Doppler speed integration for a singe range-speed response may be 256 sweeps with an update rate of e.g. 100 Hz. The range-resolution with these parameters is 0.6 m and the speed resolution is 0.048 m/s. The three beams overlap each other on ranges larger than circa 2.25 m.

The radar stations 3a-c are mutually independent and mutually incoherent thereby enabling a potentially cheap, simple radar system architecture. However, the radar stations 3a-c are calibrated, e.g. by performing a non-linear frequency distortion correction, bandwidth correction and transmitted power correction.

The radar stations 3a-c generate incident fields $F_i$ that are directed towards a region wherein a person walks. The incident fields $F_i$ impinge on the body 7 of the person causing reflected fields $F_r$ that are at least partly received by the radar stations 3a-c. The received reflected fields, also called radar data, are transmitted to the computer system 2 for processing, especially for retrieving a human motion characteristic of the human body 7.

After receipt of the radar data by the processor 5, the processor estimates height information of human body parts causing the radar data. The estimation step is e.g. performed based on trilateration. This approach might be relevant if the baseline of the radar stations 3a-c is sufficiently large. Alternatively or additionally, the estimation step is based on evaluation of received radar data power. As an example, a non-linear least-squares estimation technique may be applied based on a radar equation with range and received power of the human body parts. Thus, from a number of independent speed-range-height radar data, four-dimensional radar data are available, viz. concerning time, range, speed and height information. When the incident fields of the stations overlap a relevant height of scattering human body parts can be estimated. Further, the estimated height information is associated with the corresponding human body parts, e.g. the legs, that cause the radar data.

It is noted that instead of estimating height information, also and/or cross-range information can be estimated. Further both height information and cross-range information can be estimated. As a consequence, object position and/or spatial extension information of the object in at least one direction substantially transverse with respect to the range direction can be estimated.

The processor 5 is also arranged for performing the steps of fitting a human body model with radar data being associated with a selected estimated height information interval, and determining a human motion characteristic from the fitted human body model.

The fitting step comprises construction speed/range data from the received radar data. Thereto, the beat frequency signal is subjected to a temporal FFT algorithm and a speed FFT algorithm. The result can for each radar station be visualized in a so-called range-speed response. For each speed a range interpolation may be applied. The range-speed response may be divided in range-speed cells.

Figure 2A:
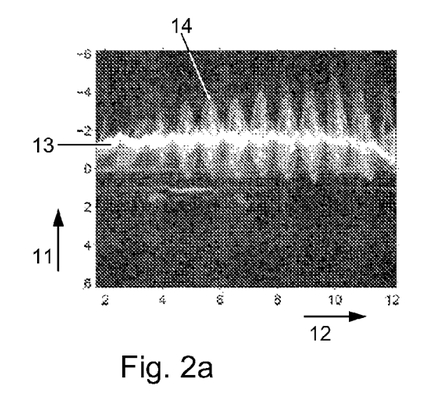
FIG. 2a-c show range-speed responses of an upper, middle and lower radar station caused by a person having swinging arms.
Figure 2B:
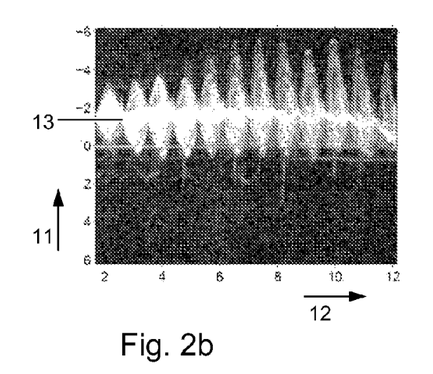
Figure 2C:
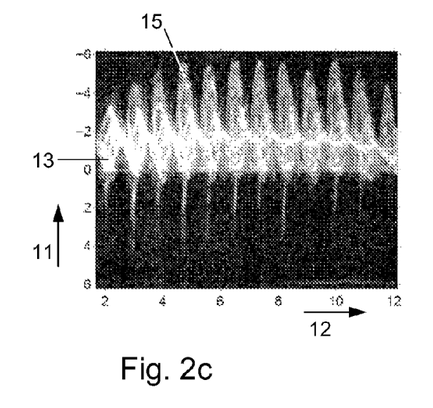

FIGS. 2a-c show range-speed responses of the upper, middle and lower radar station 3a-c, respectively, as a function of speed 11 [m/s] and range [m]. Each response, also called spectrogram, shows a body response 13 due to the torso of the human body 7. Further, a response 14 due to the legs 8 and a response 15 due to the arms 9 of the human body 7 can be distinguished. In FIGS. 2a-c, the person is walking with swinging arms 9. The observation time of these measurements is 6.5 s. The walking human has an inbound speed of circa −1.75 m/s which corresponds with a maximum power response, called the body response. The illuminated part of the human increases with increasing range which causes scintillation effects. Therefore, discrimination between individual human body parts becomes difficult. The observed spectrogram is divided in three components the body response, the leg responses and if available the arm responses. The spectrograms in FIG. 2 show that discrimination between arms and legs is difficult or impossible in case where the legs and arms interfere with each other. This is the interval between zero speed and the bodyline. Discrimination of the arms and legs is difficult but possible above the body speed in the interval of 0-6 m. Above 6 m range discrimination is almost impossible. Discrimination of arms and legs is not possible based on power information in the interval between zero and the bodyline. The spectrograms show periodic positive frequency responses which can not be explained with direct reflection onto the human body parts. These positive reflections are observed in the middle radar and bottom radar and caused by multi-path reflections of one leg with the other leg.

Figure 2D:
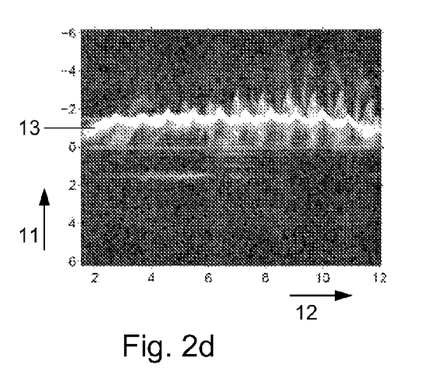
FIG. 2d-f show range-speed responses of an upper, middle and lower radar station caused by a person having arms fixed to the body.
Figure 2E:
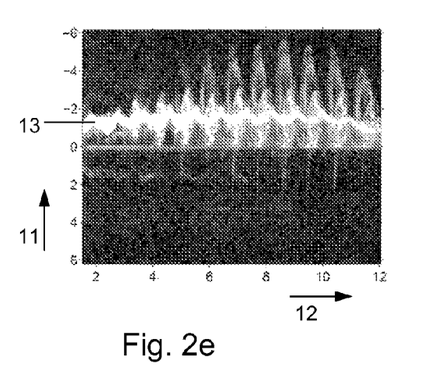
Figure 2F:
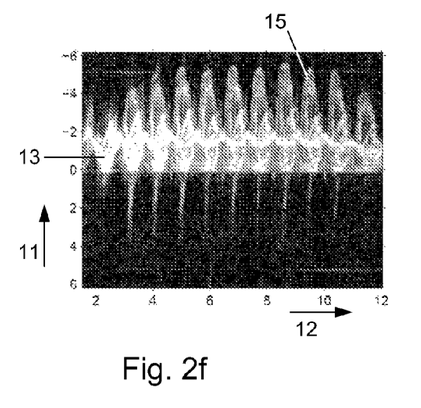

Similarly, FIGS. 2d-f show range-speed responses of the upper, middle and lower radar station 3a-c, respectively, when the person walks with hand fixed on the body. Here, no separate arm movements can be identified.

Figure 3A:
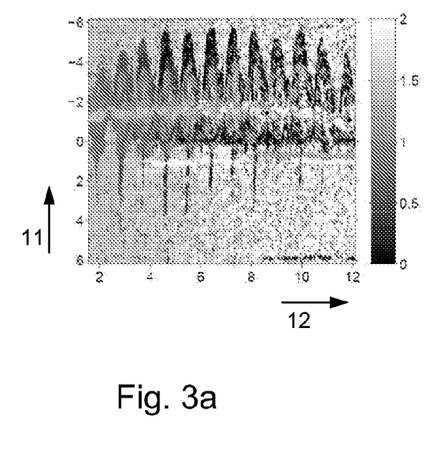
FIG. 3a shows a speed-range-height diagram for swinging arm data.
Figure 3B:
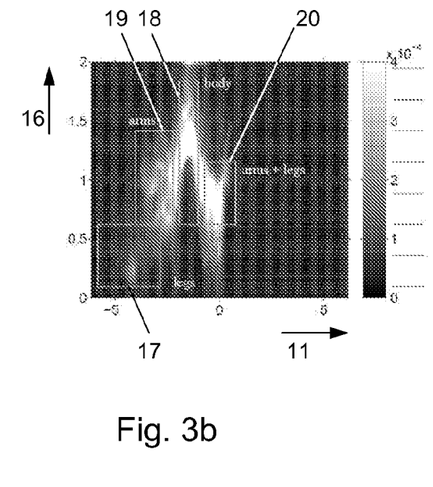
FIG. 3b shows a height-speed histogram for swinging arm data.
Figure 3C:
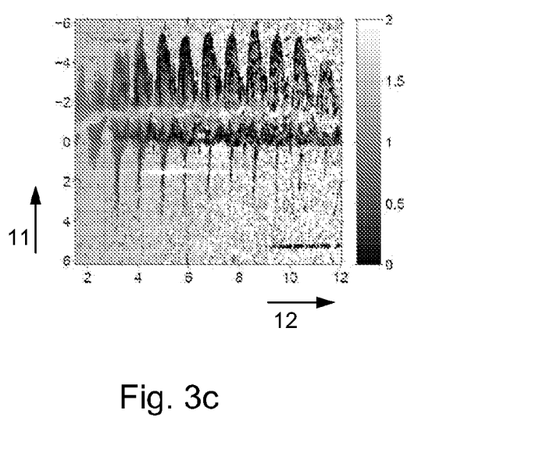
FIG. 3c shows a speed-range-height diagram for fixed arm data.
Figure 3D:
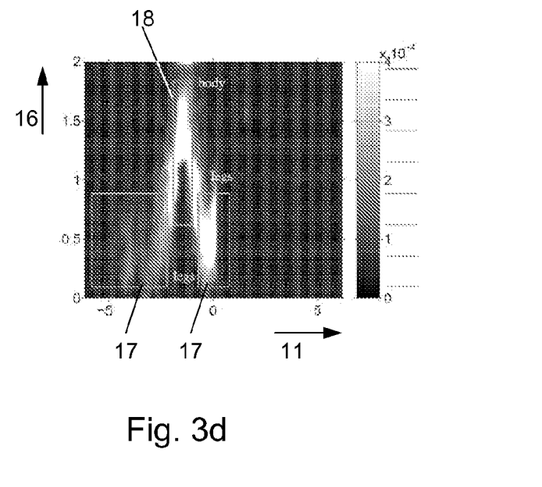
FIG. 3d shows a height-speed histogram for fixed arm data.

FIG. 3a shows a speed-range-height diagram in which the estimated height belongs to the maximum power for each speed cell. Here, the information of the speed-range responses of the three radar stations have been integrated and represented in a single image. Further, FIG. 3b shows a height-speed histogram wherein different body part responses can be identified, viz. a leg section 17, a body section 18, an arm section 19 and a combined body/arm section 20. FIG. 3a-b relate to arm swinging data. FIGS. 3c-d show a corresponding diagram and histogram, respectively, relating to fixed arm data. A height confidence interval is estimated and increases sharp below 3.0 m where there is no overlap between antenna beams. At ranges below 3.0 m a height is selected which corresponds to a maximum received power. The instantaneous height with swinging arms shows the bodyline with 1.5 m height and on both sides the arms with 1.0 m height. The speed interval −6 . . . −4 m/s show the legs with 0.5 m height. Discrimination between these elements is possible in the interval 0 . . . 8 m range. The instantaneous height estimate without swinging arms shows no arms, the height on both side of the bodyline is smaller than 0.5 m. The leg height is noisy above a range of 8 m for both measurements. The positive speed reflections have height smaller than 0.5 m. This confirms the assumption that these positive speed reflections originates of multi-path leg reflections. The speed-height histograms presented in FIG. 3 contains all human responses above the noise level. The noise level is calculated with a power histogram applied onto a range-speed region without any response. The estimated range-speed segments with human body parts are indicated. The height on both sides of the bodyline with swinging arms is higher than without swinging arms. The body height with swinging arms is lower than the one without swinging arms caused by the range extend where arms and body lie in equal speed cells.

Figure 4A:
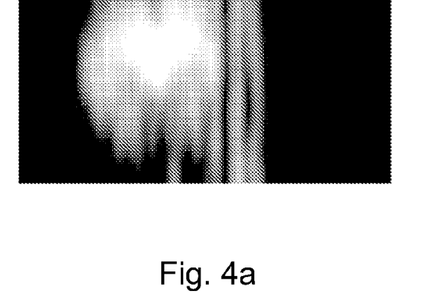
FIG. 4a shows a differential range-speed histogram.
Figure 4B:
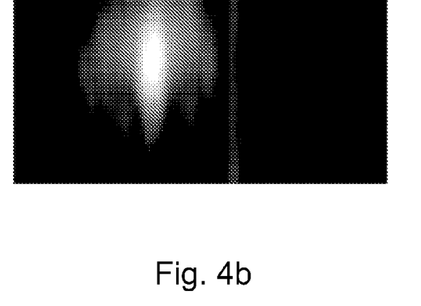
FIG. 4b shows a differential range-speed power diagram.

FIG. 4a shows a differential range-speed histogram as a function of differential range 12 and speed 11, wherein succeeding responses have been combined with each other in a way wherein the specific structure of the response remains. As such, the range of the individual superposed contributions has been normalized and the signal-to-noise ratio of the responses increases, thereby showing micro Doppler effects, such as the swinging arms. FIG. 4b shows a corresponding differential range-speed power diagram.

The time interval of an individual response contribution can be chosen in several manners. Half the step frequency gives the differential range-speed response of one cycle. This cycle contains responses of all human body parts. A larger time interval gives a better signal-to-noise ratio but also decorrelation of micro Doppler effects of succeeding rotating elements. A time interval smaller than half the step frequency gives a differential range-speed response with incomplete ellipsoids. It depends on the human cycle phase which responses of the human body parts are observed.

It appears that in the differential range-speed domain, periodical movements of human parts, such as legs and arms, correspond to specific curves, viz. ellipsoids. The specific ellipsoid parameters correspond to specific human part movement characteristics such as amplitude and average speed.

Figure 4C:
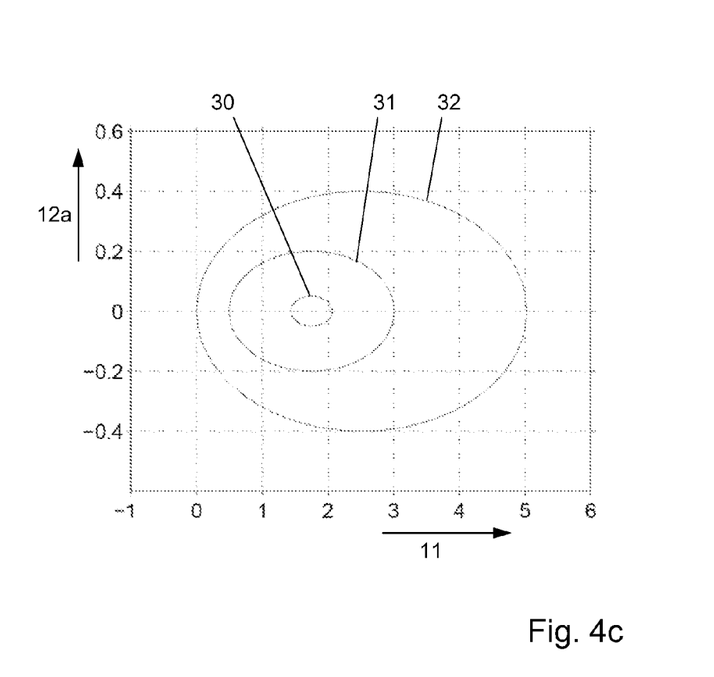
FIG. 4c shows a differential range-speed histogram with a human body model.

FIG. 4c shows a differential range-speed histogram wherein a human body model has been depicted. The body model includes three ellipsoids, viz. an inner ellipsoid 30, a middle ellipsoid 31 and an outer ellipsoid representing the body motion, arm motion and leg motion, respectively, in the differential range and speed domain.

In FIG. 4a, the bodyline gives a strong histogram value in the middle of the histogram. Swinging human body parts are observed with ellipsoid patterns. The body has a small ellipsoid in the middle observed in the top and middle radar. The legs show larger ellipsoids lying near the contour of the histogram. The arms show smaller ellipsoids with swinging arms between the body and the leg ellipsoids. The centre of the body ellipsoid and the arms ellipsoid are almost equivalent. The centre of the leg ellipsoid has a larger speed than the body and legs ellipsoids. The characteristics observed in the differential range-speed-power, see FIG. 4b, are equivalent with the one of the differential range-speed-histograms. The body gives the highest response with small ellipsoid. The arms if available are observed on both sides of the body with a greater ellipsoid. The legs give the greatest ellipsoid.

Figure 5A:
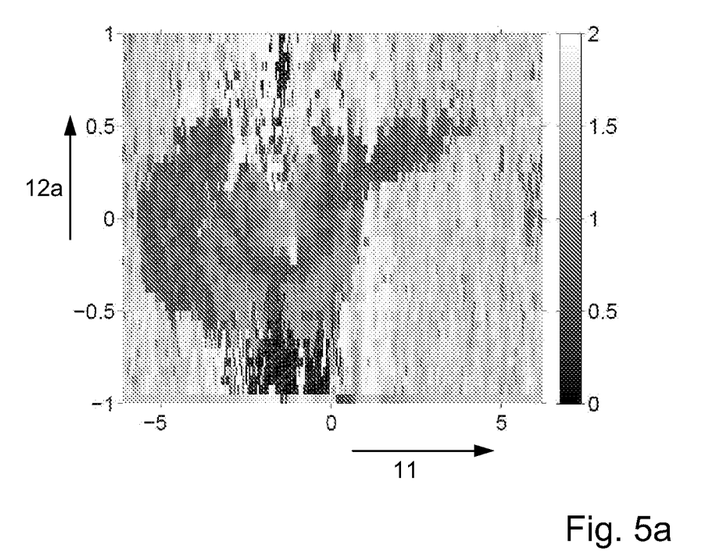
FIG. 5a shows a differential range-speed-height diagram for swinging arm data.
Figure 5B:
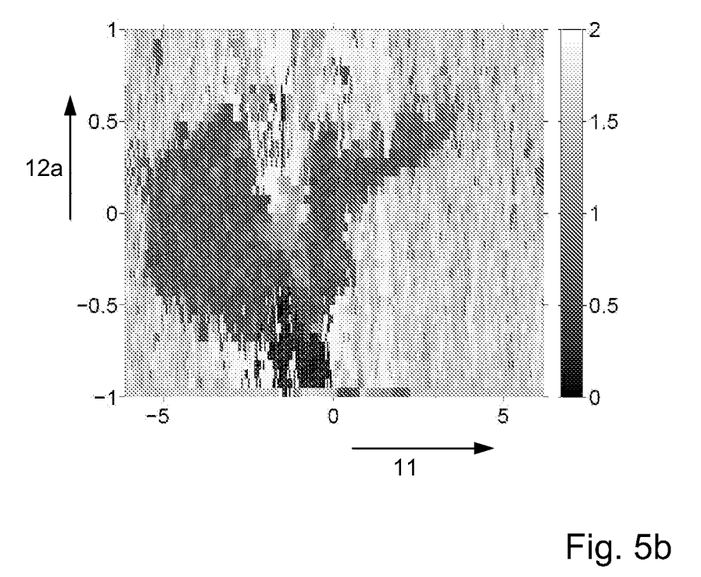
FIG. 5b shows a differential range-speed-height diagram for fixed arm data.

FIGS. 5a and 5b show a differential range-speed-height diagram for swinging arm data and for fixed arm data, respectively. By fitting the ellipsoids of the human body model with the radar data, a human motion characteristic can be determined from the model, e.g. a torso parameter, a leg parameter and/or an arm parameter.

Figure 6:
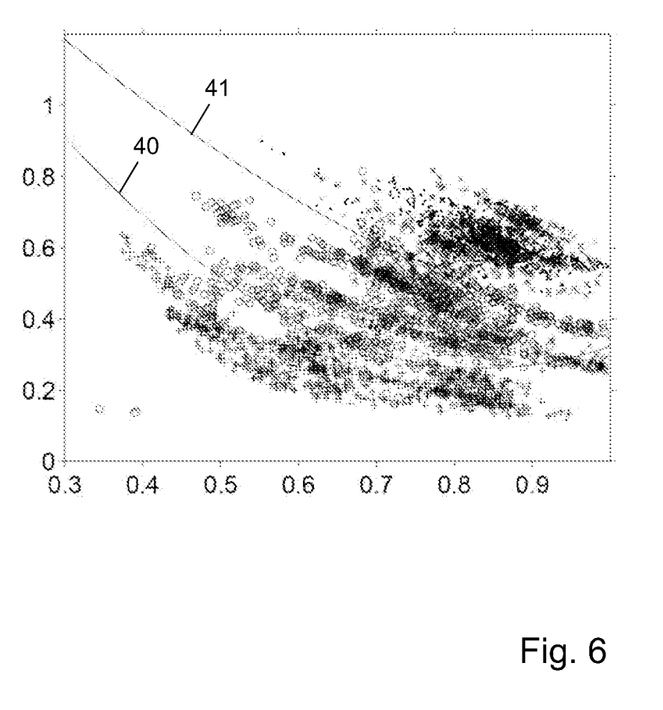
FIG. 6 shows a diagram as a function of radii and frequency parameters.

FIG. 6 shows a diagram as a function of radii [m] and frequency [Hz] parameters. Here, the circles and the dots relate to estimated swinging arms and estimated swinging legs, respectively, while plus and time symbols relate to estimated non-swinging arms and non-swinging legs, respectively. The diagram further shows boundary lines 40, 41 to automatically perform a classifying step on the estimated human motion characteristic in one class of a pre-determined number of classes, based on characteristic values.

FIG. 6 shows that the estimated arm rotation frequency and arms radii with swinging arms have a lower rotation frequency and smaller radii than the legs, they lie below these. The arm rotation frequency and arm radii without swinging arms shows a very small ellipsoid which belong to the rotation of the body for example the shoulders. The swinging arms show larger rotation frequency and radii. The legs have largest rotation frequency and radii. The boundaries show a $\omega ry=\upsilon$ rotating point function where the constant $\upsilon$ has speed dimension. Estimated constants are $\upsilon=1.63$ m/s for swinging versus non-swinging arms and $\upsilon=2.65$ m/s for legs versus arms or body. The physical dimensions of the human body parts and corresponding swinging are related to each other and have these boundaries. The inbound classification performs best due to the line-of-sight with the swinging arms if available. The outbound walking human shows overlapping frequency and radii leg responses for swinging and non-swinging arms. During the swing parts the arms lie sometimes behind the body and give no micro Doppler. Only a body micro Doppler is observed and the classification fails.

According to an aspect of the invention, the scatter height can be estimated using a low cost non-coherent radar sensor network. The height estimation approach can be applied onto range-speed responses and the differential range-speed-power response. An accurate differential range is estimated with range interpolation. Body parts show micro Doppler effects which appears as ellipsoids in the differential range-speed responses. Fitting ellipsoid models with selected heights onto the differential range-speed-height response gives the legs and arm parameters if available. These parameters show that identification of the body parts is possible.

The method may be applied to real radar measurements with different scenarios. The measurement setup has three low cost non-coherent radars in a vertical array. After calibration the low cost radars used give useful measurements. The height estimate applied has a confidence interval of $\delta r \approx r/30$ m. Identification of arms is possible in the differential range-speed histogram of a single channel. The identification is possible in the 0-6 m range and depends on the illuminated part of the human, if only legs are illuminated the arms are not visible and identification not possible. Identification of arms of inbound and outbound walking human in the differential range-speed-height is possible on ranges where the antenna beams overlap in our case the 3.0-12 m range. The height makes a clear discrimination between arms and leg possible and used for segmentation of the differential range-speed-height response. Ellipsoid fits applied on the segmented differential range-speed-height response gives the legs and arms parameters if available. Correct classification of swinging and non-swinging arms with radii and rotation frequency is 90% with center range and center speed 72%. Correct classification of legs and arms or body with radii and rotation frequency is 93% with center range and center speed 78%. The height approach can in principle be extended in three dimensions for cross-range information. The differential range-speed responses are starting points for automatic micro Doppler effects analysis with an ellipsoids model of moving human body parts.

The method for estimating a human motion characteristic from a radar signal can be performed using dedicated hardware structures, such as FPGA and/or ASIC components. Otherwise, the method can also at least partially be performed using a computer program product comprising instructions for causing a processor of the computer system to perform the above described steps of the method according to the invention. All steps can in principle be performed on a single processor. However it is noted that at least one step can be performed on a separate processor, e.g. the step of receiving the radar data of an object from a multiple beam radar system and/or the step of fitting an object model with radar data being associated with a selected estimated height and/or cross-range information interval.

Figure 7:
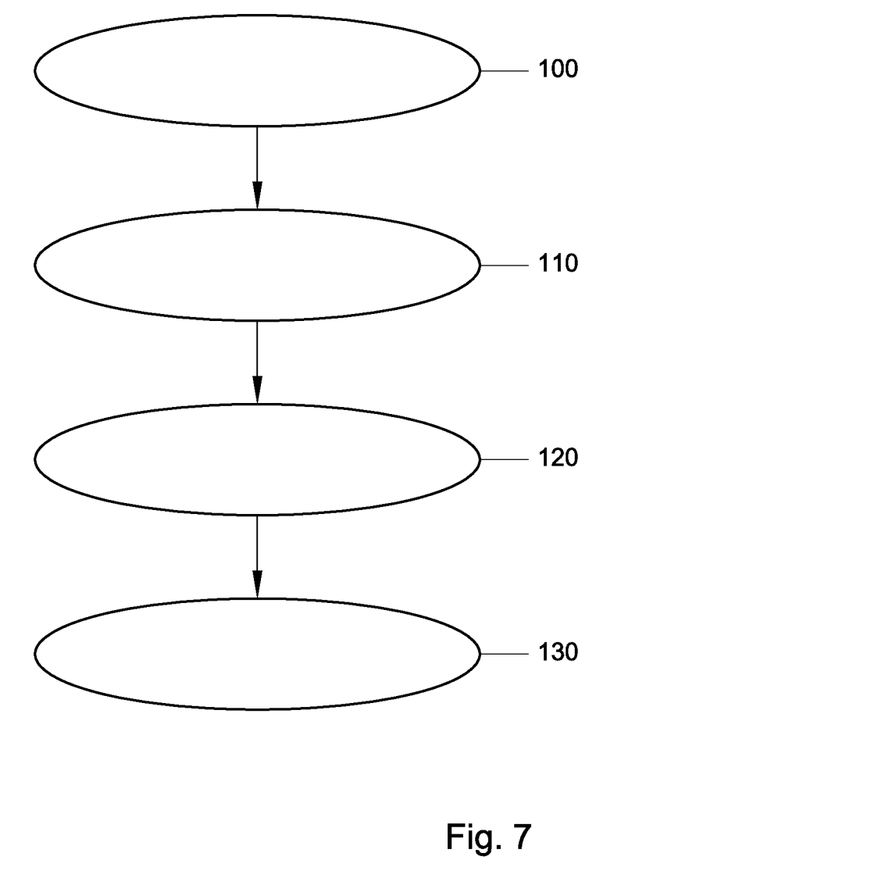
FIG. 7 shows a flow chart of an embodiment of a method according to the invention.

FIG. 7 shows a flow chart of an embodiment of the method according to the invention. A method is used for estimating an object motion characteristic from a radar signal. The method comprises the steps of receiving (100) radar data of an object from a multiple beam radar system, associating (110) radar data with estimated height and/or cross-range information of human body parts causing the corresponding radar data, fitting (120) an object model with radar data being associated with a selected estimated height and/or cross-range information interval, and determining (130) a human motion characteristic from the fitted object model.

The invention is not restricted to the embodiments described herein. It will be understood that many variants are possible.

Instead of using three radar stations also another number of radar stations can be applied, e.g. four radar stations or more. Further, the radar stations can be arranged otherwise, e.g. for generating a three-dimensional spatial image.

Further, the radar stations can be coupled in such a way that they operate in a coherent way, so that phase information can be used to obtain more accurate angle information, thereby improving the height estimation of the human parts.

In addition, instead of using a multiple number of radar stations, also a single radar station transmitting a multiple number of radar beams can be used.

It is noted that the method according to the invention may be used for estimating an object motion characteristic from a radar signal. The object can be a human body or an animal body, such as a horse. However, the object may also be a vehicle.

Other such variants will be obvious for the person skilled in the art and are considered to lie within the scope of the invention as formulated in the following claims.

The invention claimed is:

1. A method for estimating an object motion characteristic from a radar signal, comprising the steps of
   receiving radar data of an object from a multiple beam radar system;
   associating radar data with at least one of estimated height or cross-range information of object parts causing the corresponding radar data;
   fitting an object model with radar data being associated with at least one of a selected estimated height or cross-range information interval, and
   determining an object motion characteristic from the fitted object model.

2. The method according to claim 1, wherein the associating step comprises estimating at least one of height or cross-sectional information of object parts, based on at least one of trilateration or received radar data power.

3. The method according to claim 1, wherein the fitting step comprises constructing at least one of speed or range data from the received radar data.

4. The method according to claim 1, wherein the object model comprises an ellipsoid as a function of at least one of speed or range parameters.

5. A method according to claim 1, wherein the object comprises a human body.

6. The method according to claim 5, wherein the object model comprises at least one of a torso parameter, a leg parameter or an arm parameter.

7. The method according to claim 1, further comprising the step of representing radar data as a function of speed, range and at least one of estimated height and cross-sectional information.

8. The method according to claim 1, further comprising the step of representing radar data in a single image.

9. The method according to claim 1, further comprising the step of classifying the estimated object motion characteristic in one class of a pre-determined number of classes, based on characteristic values.

10. The method according to claim 9, wherein the classifying step is performed based on estimated frequency and radius parameter values.

11. The method according to claim 1, wherein the receiving step comprises receiving radar data from at least three radar stations.

12. The method according to claim 1, wherein the radar system comprises a multiple number of separate radar stations.

13. The method according to claim 1, wherein the multiple beams of the radar system are mutually coherent.

14. A computer system comprising:
one or more processors;
a non-transitory computer readable medium operatively associated with the one or more processors having encoded thereon software comprising a set of instructions that, when executed by at least one of the one or more processors, causes the computer system to:
receive radar data of an object sent from a multiple beam radar system;
associate radar data with at least one of estimated height or cross-range information of object parts causing the corresponding radar data;
fit an object model with radar data being associated with at least one of a selected estimated height or cross-range information interval, and
determine an object motion characteristic from the fitted object model.

15. An article of manufacture comprising a non-transitory computer readable medium having encoded thereon a set of instructions executable by a computer system to perform one or more operations, the set of instructions comprising:
instructions for receiving radar data of an object from a multiple beam radar system;
instructions for associating radar data with at least one of an estimated height or cross-range information of object parts causing the corresponding radar data;
instructions for fitting an object model with radar data being associated with at least one of a selected estimated height or cross-range information interval, and
instructions for determining an object motion characteristic from the fitted object model.

* * * * *